United States Patent
Jirgal et al.

(10) Patent No.: US 6,574,691 B1
(45) Date of Patent: Jun. 3, 2003

(54) APPARATUS AND METHOD FOR INTERFACING A NON-SEQUENTIAL 486 INTERFACE BURST INTERFACE TO A SEQUENTIAL ASB INTERFACE

(75) Inventors: James J. Jirgal, Chandler, AZ (US); David Ross Evoy, Tempe, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/363,694

(22) Filed: Jul. 28, 1999

(51) Int. Cl.[7] .............................................. G06F 13/00
(52) U.S. Cl. ...................... 710/100; 710/306; 710/310
(58) Field of Search ................................. 710/100, 305, 710/306, 310, 311, 312, 313, 315

(56) References Cited

U.S. PATENT DOCUMENTS

| | | | |
|---|---|---|---|
| 5,301,141 A | 4/1994 | Traylor | 365/49 |
| 5,450,542 A | 9/1995 | Lehman et al. | 395/162 |
| 5,454,107 A | 9/1995 | Lehman et al. | 395/480 |
| 5,640,517 A * | 6/1997 | Parks et al. | 395/285 |
| 5,745,791 A | 4/1998 | Peek et al. | 395/872 |
| 5,751,975 A | 5/1998 | Gillespie et al. | 395/306 |
| 5,761,454 A | 6/1998 | Adusumilli et al. | 395/306 |
| 5,768,612 A | 6/1998 | Nelson | 395/800.32 |
| 5,835,739 A | 11/1998 | Bell et al. | 395/308 |
| 5,835,784 A | 11/1998 | Gillespie et al. | 395/306 |
| 5,838,935 A | 11/1998 | Davis et al. | 395/309 |
| 5,915,126 A * | 6/1999 | Maule et al. | 395/855 |
| 6,243,817 B1 * | 6/2001 | Melo et al. | 713/300 |
| 6,366,973 B1 * | 4/2002 | Lo et al. | 710/128 |
| 6,425,071 B1 * | 7/2002 | Lo et al. | 712/41 |

OTHER PUBLICATIONS

"Bus Functional Description", Pentium™ Processor User's Manual, vol. 1; Pentium Processor Data Book, Intel Corporation, Order No. 241428–002, Chapter 6, 1994.

"Bus Operation", Intel 486™ DX Microprocessor Data Book, Intel Corporation, Order No. 240440–005, Chapter 7, Oct. 1992.

AMBA (Advanced Microcontroller Bus Architecture) Specification, Advanced RISC Machines Ltd. (ARM), Revision D, Chapter 3, Apr. 1997.

* cited by examiner

Primary Examiner—Sumati Lefkowitz
Assistant Examiner—X. Chung-Trans
(74) Attorney, Agent, or Firm—Peter Zawilski

(57) ABSTRACT

An apparatus is provided for interfacing a processor with a bus of a computer system wherein the processor performs burst read operations in both a sequential and a non-sequential manner and the bus is incapable of supporting burst operations that are non-sequential. The apparatus includes an interface adaptor circuit that is coupled between the processor and the bus. The interface adaptor circuit is operative as a burst order translator between the processor and the bus, and has a bridge configured to connect together the processor and the bus. The bridge is operative to translate processor burst operations into operations supported by the bus. The bridge has a processor interface coupled between the processor and the interface adaptor circuit and a bus interface coupled between the bus and the interface adaptor circuit. The bridge is operative to enable compatibility between the processor interface and the bus interface such that non-sequential burst access from the processor is supported and deliverable as sequential burst access to the bus.

20 Claims, 3 Drawing Sheets

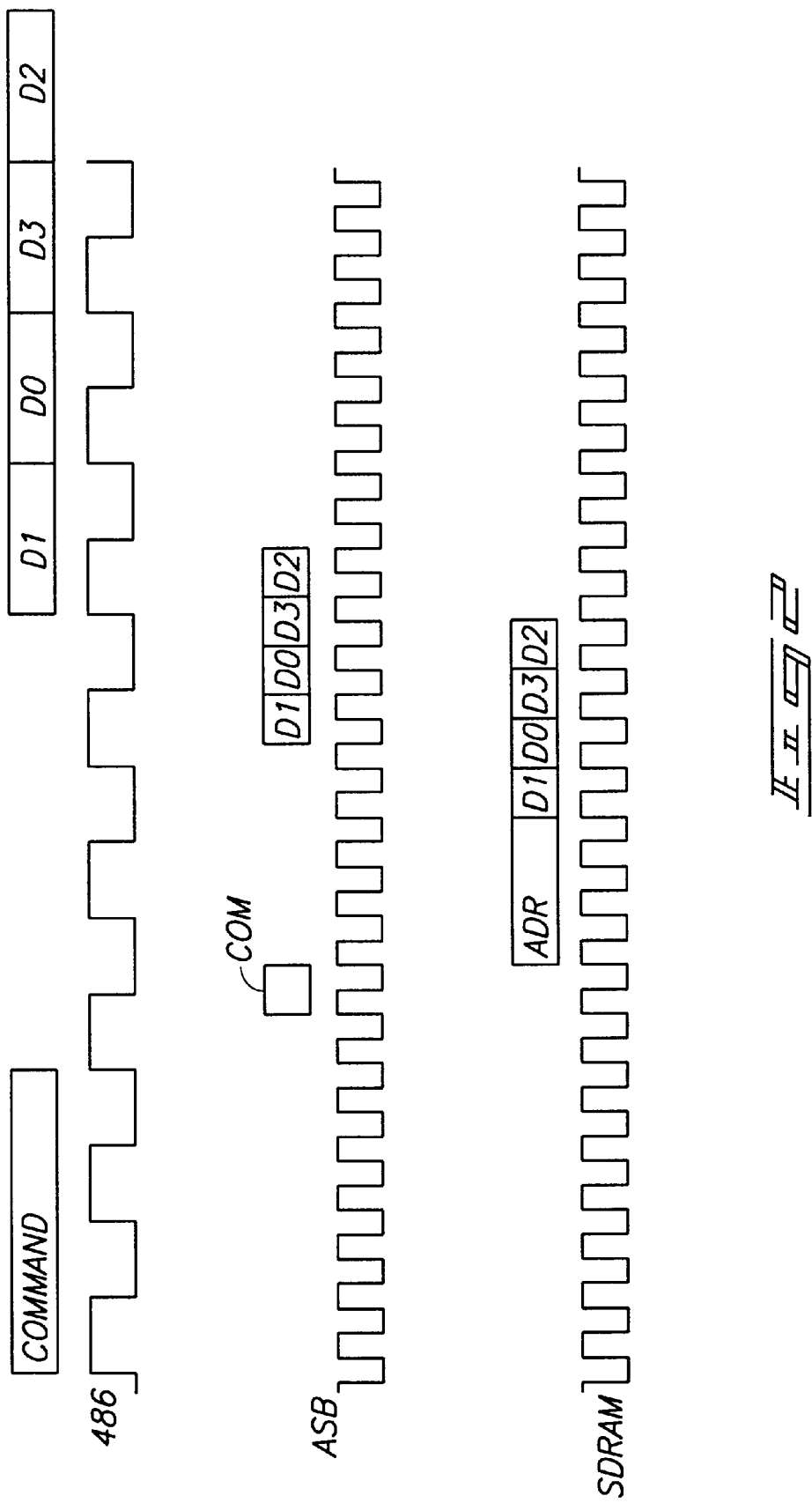

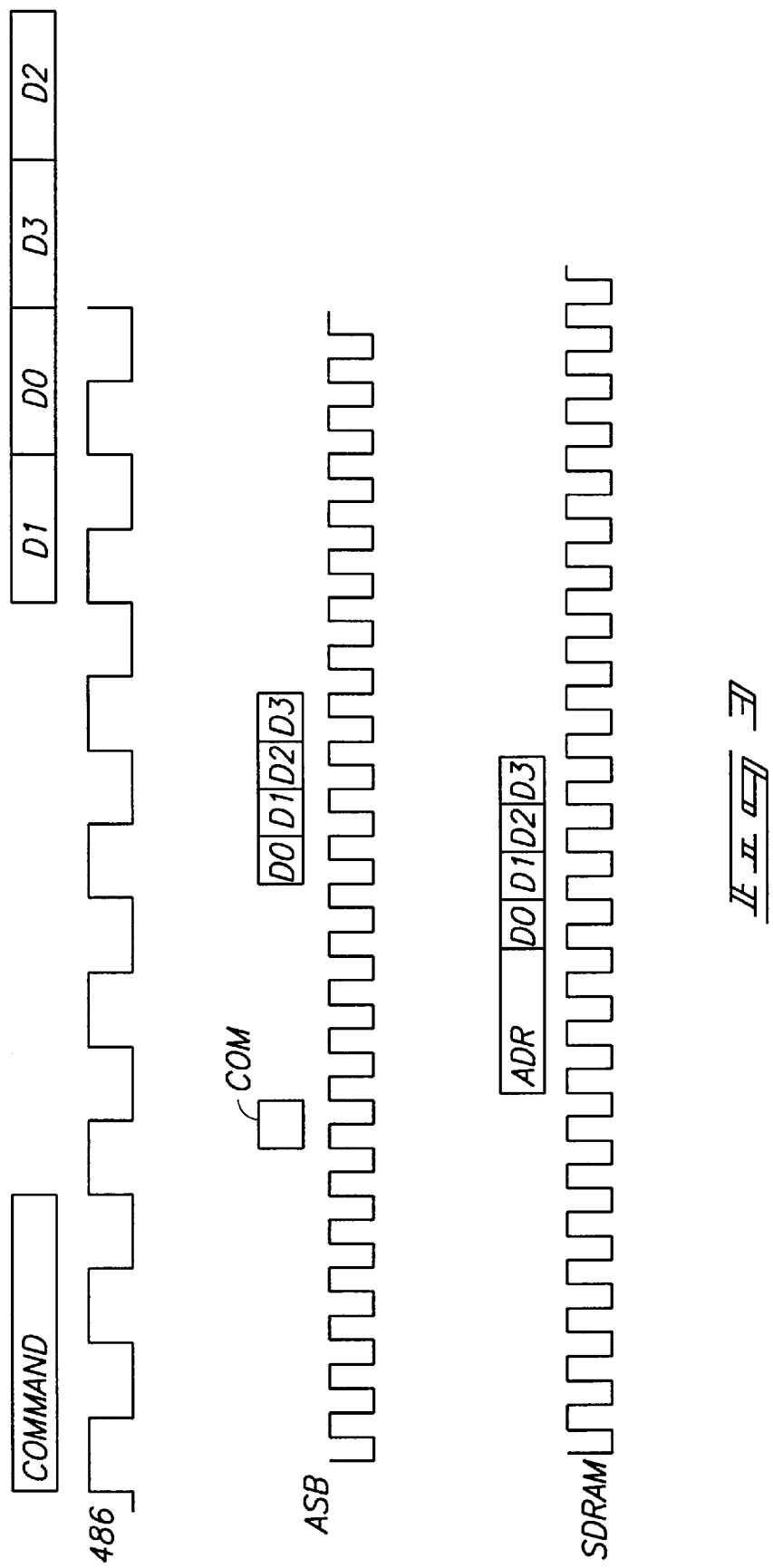

APPARATUS AND METHOD FOR INTERFACING A NON-SEQUENTIAL 486 INTERFACE BURST INTERFACE TO A SEQUENTIAL ASB INTERFACE

TECHNICAL FIELD

The present invention pertains to the field of computer architecture, and more particularly, this invention relates to an apparatus and a method for interfacing a non-sequential 486 interface burst interface to a sequential ASB interface.

BACKGROUND OF THE INVENTION

A prior computer system typically includes a central processing unit (CPU), a system bus, memory and peripheral devices. The CPU is connected with the bus so as to communicate with the memory and peripheral devices. In one instance, the memory includes random access memory (RAM) and read-only memory (ROM). Typical peripheral devices include a keyboard, a mouse, a display, a hard disk drive, a serial communication port, a parallel communication port, and a network connection. The ability of the CPU to communicate with various devices coupled with the system bus is realized by maintaining interface compatibility between the CPU and various peripheral devices via the system bus. However, certain applications require the use of cost effective processors that might not be compatible with modern system buses and memory systems.

One prior approach to maintaining compatibility between a CPU and peripheral components is to use a CPU and peripheral devices that both support sequential burst order read operations. However, older CPUs such as the Intel 486™DX processor use an Intel burst order wherein the read burst order from the processor is sequential for some read operations and is non-sequential for other read operations. When there is a need to combine such a processor with a modern standard bus, such as an ASB bus, there exists a problem in that the ASB bus cannot support non-sequential burst access methods.

Another prior approach to maintaining compatibility between a CPU and peripheral components is to use a CPU and peripheral devices that both support non-sequential burst order read operations. However, as discussed above, modern standard buses, such as an ASB bus, cannot support non-sequential burst access methods.

SUMMARY OF THE INVENTION

The present invention relates to a method and apparatus for interfacing older cost effective processors with modern buses and memory systems. In one embodiment, an Intel 486™DX processor is interfaced to a memory subsystem through a standard bus, such as an ASB bus. The ASB bus cannot support a non-sequential burst access method, whereas the 486™DX processor uses an Intel read burst order that is sequential for some read operations and non-sequential for other read operations. Other older processors pose similar problems in that some read operations are sequential and others are non-sequential.

According to one aspect of the invention, an apparatus is provided for interfacing a processor with a bus of a computer system wherein the processor performs burst read operations in both a sequential and a non-sequential manner and the bus is incapable of supporting burst operations that are non-sequential. The apparatus includes an interface adaptor circuit that is coupled between the processor and the bus. The interface adaptor circuit is operative as a burst order translator between the processor and the bus, and has a bridge configured to connect together the processor and the bus. The bridge is operative to translate processor burst operations into operations supported by the bus. The bridge has a processor interface coupled between the processor and the interface adaptor circuit and a bus interface coupled between the bus and the interface adaptor circuit. The bridge is operative to enable compatibility between the processor interface and the bus interface such that non-sequential burst access from the processor is supported and deliverable as sequential burst access to the bus.

According to another aspect of the invention, a computer system is provided having a processor, a bus and an interface adaptor circuit. The processor is configured to perform burst read operations in both a sequential and a non-sequential manner. The bus is incapable of supporting burst read operations that are non-sequential. Furthermore, the interface adaptor circuit is coupled between the processor and the bus, and has a bridge configured to connect together the processor and the bus. The bridge is operative to translate processor burst operations into bus-compatible burst operations. Additionally, the bridge is configured to enable compatibility between the processor and the bus such that non-sequential burst access from the processor is supported and deliverable as sequential burst access to the bus.

According to yet another aspect of the invention, a method is provided for communicating between a processor and a bus of a computer system wherein the processor performs burst read operations in both a sequential and a non-sequential manner and the bus is incapable of supporting burst operations that are non-sequential. The method includes the steps of: configuring an interface adaptor circuit between the processor and the bus to operate as a burst order translator; receiving burst read operations from the processor comprising at least one of sequential and non-sequential read operation burst orders; and translating the received processor burst operations into operations supported by the bus so as to enable compatibility between the processor and the bus such that non-sequential burst access from the processor is supported and deliverable as sequential burst access to the bus.

BRIEF DESCRIPTION OF THE DRAWINGS

Preferred embodiments of the invention are described below with reference to the following accompanying drawings.

FIG. 2 is a timing diagram of the states of the 486D™X processor, ASB interface, and SDRAM interface of FIG. 1 showing a theoretical transfer from 486 Command through data delivery, with the ASB and SDRAM transfers shown.

FIG. 3 is a timing diagram of the states of the 486™DX processor, ASB interface and SDRAM interface of FIG. 1 showing the effects of waiting for the ASB transfer to complete prior to starting the 486 transfer.

DETAILED DESCRIPTION OF THE PREFERRED EMBODIMENTS

Figure 1:
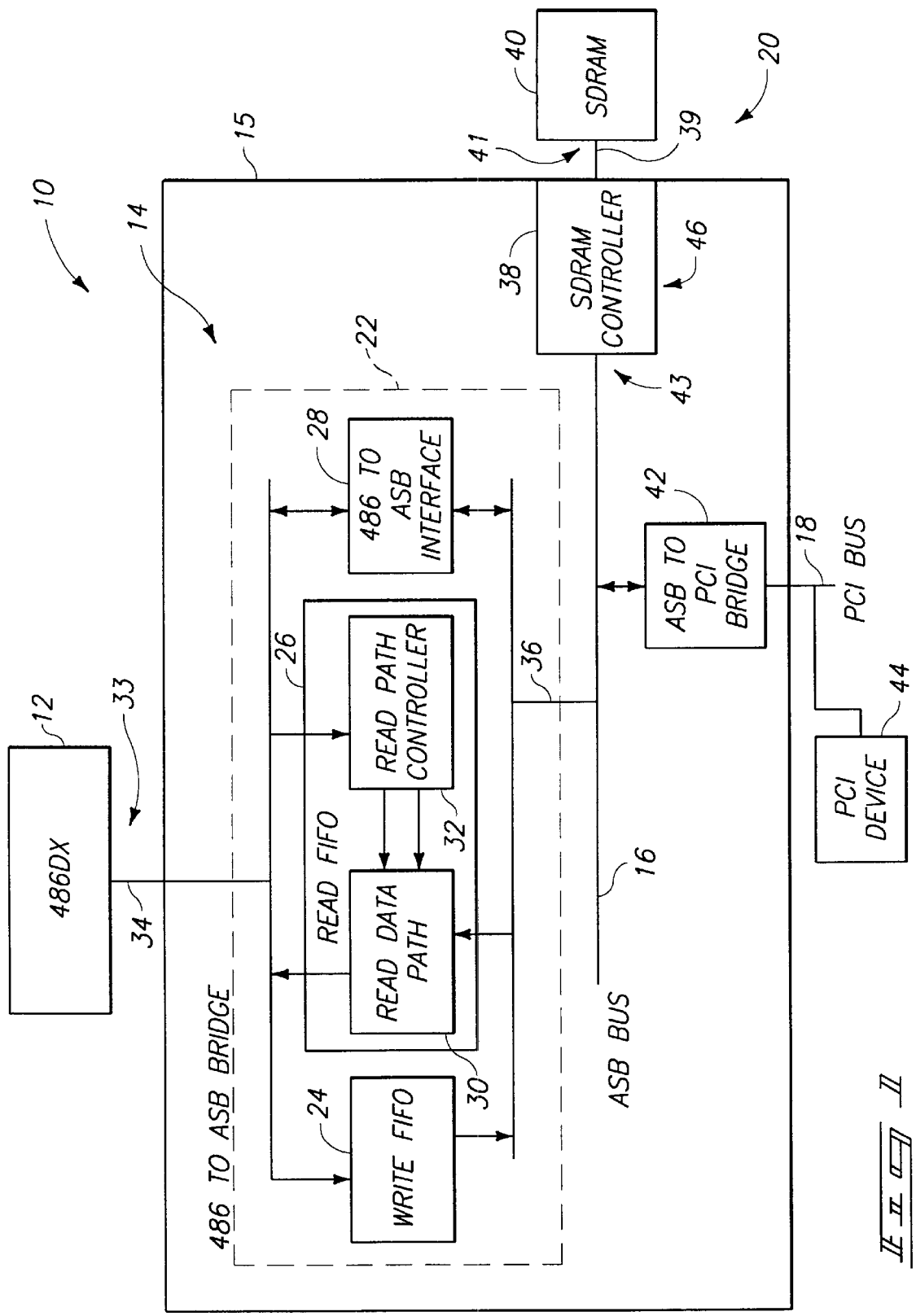
FIG. 1 is a partial block diagram of a computer system that includes a processor supporting non-sequential burst access, an ASB bus, a PCI bus, ASB peripheral devices, standard memory controllers, memory, a 486-to-ASB bridge, an ASB-to-PCI bridge, and a 486-to-ASB interface that facilitates processor non-sequential burst access with memory parts and buses supporting only sequential burst access in accordance with one embodiment of the present invention.

This disclosure of the invention is submitted in furtherance of the constitutional purposes of the U.S. Patent Laws "to promote the progress of science and useful arts" (Article 1, Section 8).

One related art implementation for facilitating processor non-sequential burst access with memory supporting only sequential burst access involves performing interrupted burst cycles. Hence, an older and more cost effective processor, such as an Intel 486™DX processor, can be interfaced with a modern bus and memory subsystems that do not support the required burst order. However, such implementation requires significant overhead in that interrupted burst cycles must be implemented with added component complexity and, operating steps.

Another implementation for facilitating processor non-sequential burst access with modern buses and memory subsystems is disclosed below with reference to FIGS. 1–3. Such implementation overcomes the above-listed problem of adding to the overhead required to achieve interrupted burst cycles.

One compelling reason for supporting a non-sequential burst access is provided in that this method is still used in 486 and Pentium processors manufactured by Intel Corporation. In many design applications, such older processor designs and architectures are still very popular, and their implementation is often required for code compatibility and cost reasons. For example, a large amount of software is already available for such processors, and the cost of developing software code for many applications is becoming the primary cost of implementing a design, as hardware costs continue to spiral downward.

One reason for also supporting a sequential burst access is provided in that this method is used by SDRAM memory parts. Additionally, this method is used by PCI and ASB buses. Furthermore, this method comprises a standard method that is used by most burst devices.

Pursuant to Applicant's invention, an Intel 486™DX processor, or CPU, is converted to a standard ASB sequence in order to allow use of standard memory controllers, ASB peripherals, and ASB-to-PCI bridge devices. One benefit results in that changes to a single block are isolated, and SDRAM can be used in a very efficient mode of operation. Such changes also allow the use of existing ASB buses, RAM controllers, and PCI devices without requiring additional system modifications. However, it is understood that one trade-off results in that the 486™DX interface will not necessarily be optimal for all operations. Therefore, consideration needs to be made as to when the benefits outweigh the trade-offs.

In summary, the performance impact of converting such a processor to a standard ASB sequence is several-fold. First, non-burst operations remain unaffected. Such holds true for both read operations and write operations. For the case of Intel Pentium processors, cache-able lines always burst, and non cache-able lines never burst. For the case of Intel 486 processors, some non cache-able line bursts can occur. Secondly, write operations always burst sequentially, if they burst at all. Therefore, there do not exist any non-sequential burst write operations. Thirdly, burstable read operations that start with natural alignment to the cache are found to burst in order. For example, for the case of an Intel 486™DX processor, any transfer that starts with both A2 and A3 set to zero "0" will result in a linear burst which does not need any special handling. Finally, burstable read operations that start with A2 and/or A3 set to one "1" will burst out of order at the 496 bus. These transfers will be handled by the 486-to-ASB interface which performs a 4 word burst linear read on the ASB bus starting with addresses A2 and A3 set equal to zero "0". The entire 16 byte block will then be transferred into a buffer. The data is then transferred from this buffer to the 486™DX processor in the non-linear order required by the 486™DX interface.

As used in this disclosure, an ASB bus has characteristics provided within an AMBA (Advanced Microcontroller Bus Architecture) specification, published by Advanced Risc Machines, Ltd. (ARM), Revision D, Chapter 3, April 1997. This specification is incorporated herein by reference as evidencing the presently understood state of the art. An ASB bus refers to an advanced system bus, and ASB and APB buses are provided within the architecture of the AMBA specification.

Additionally, the Intel 486™DX Microprocessor has an architecture that is presently understood in the art. Such architecture is disclosed within Intel 486™DX Microprocessor data book, by Intel Corporation, Order No. 240440-005, Chapter 7, published October 1992. Such data book is herein incorporated by reference as evidencing the presently understood state of the art.

FIG. 1 schematically illustrates in partial block diagram form the architecture and circuitry of a microprocessor based computer system indicated generally by reference numeral 10. In one embodiment, computer system 10 is a personal computer (PC) SYSTEM. In other embodiments, computer system 10 can be any other computer system that benefits from using an older and more cost effective processor with modern busses and memory subsystems. Examples of such other embodiments include handheld computers, personal digital assistants, laptop and notebook computers, set-top satellite boxes, Internet access devices, and any portable computer capable of using a WIN CE operating system.

In the presently preferred embodiment, computer system 10 employs an Intel 486™DX processor, or CPU, 12. Processor 12 contains a bus unit that is enhanced to run two types of cycles: standard cycles and burst cycles. The basic processor bus cycle is a standard cycle, whereas burst cycles are implemented within a burst mode of operation for the transfer of large amounts of data from main memory.

When a processor (i.e., microprocessor or CPU), such as processor 10, requests information from a main memory, the bus unit will send an address over the bus in the first clock cycle and then wait for the corresponding information to be supplied. This address-data sequence is then repeated for each piece of information that is requested. Generally, each new piece of requested information will be in close proximity to previously requested information. Bursting uses this proximity advantageously in that the address pointer is automatically modified in order to retrieve the next piece of information while retrieving the current piece of information. Hence, the bus is filled with data instead of addresses.

As shown in FIG. 1, processor 12 is interfaced via interface circuitry 14 with an ASB bus 16 to a PCI bus 18 and a memory subsystem 20. Processor 12 is connected with ASB bus 16 via a 486-to-ASB bridge 22 having a write FIFO 24, a read FIFO 26 and a 486-to-ASB interface 28. 486™DX processor 12 is connected to bridge 22 via a common bus 34 having both a data portion and an address portion. A processor interface 33 is associated with processor 12 at the connection with bus 34. Similarly, bridge 22 is connected to ASB bus 16 via an ASB bus connection 36. Bridge 22 comprises interface circuitry 14 that is provided on an integrated circuit (IC) 15, or chip.

As shown in the embodiment depicted in FIG. 1, write FIFO 24 comprises a First-In, First-Out (FIFO) memory implemented as a buffer for storing information delivered from processor 12 to ASB bus 16. Similarly, read FIFO 26 comprises a First-In, First-Out (FIFO) memory implemented as a buffer for storing information delivered from ASB bus 16 to processor 12. Write FIFO queue 24 forms a data storage location that is provided in an incrementing manner from the CPU or processor 12. Read FIFO 26 is provided as temporary random access memory (RAM).

Also according to FIG. 1, read FIFO 26 includes a read data path 30 and a read path controller 32. Read data path 30, in normal operation, is a FIFO memory, or buffer. However, when read path controller 32 detects a non-aligned transfer from processor 12, the FIFO behavior of read data path 30 is modified. More particularly, read FIFO 26 still fills in the same manner. However, read FIFO 26 does not begin to empty until it is full. This modified behavior for read FIFO 26 depends upon the fact that all burst transfers are a full cache line. However, if this assumption cannot be validated, preferably the read continues from memory 40 (here SDRAM) as a 4 word burst in order to fill the read data path 30. In this case, such read operation is preferred in that the "extra" words transfer very quickly from SDRAM 40. Hence, the data is unloaded from read data path 30 in the order that is required by 486™DX processor 12.

As implemented in FIG. 1, ASB bus 16 and PCI bus 18 each comprise a commercially available industry standard bus lacking any special modifications. The write path provided by write FIFO 24 is implemented as a standard FIFO. Preferably, a length of 4 words, or 16 bytes, is recommended in order to allow 486™DX processor 12 to complete a single cache line cast-out operation while ASB bus 18 is busy. Hence, internal operations can continue while ASB bus 16 is busy.

It is intended that only one 496 operation is pending at any given time. Accordingly, write FIFO 24 and read FIFO 26 should both be empty before the 486-to-ASB bridge 22 will begin to process another 496 cycle. However, such requirement should not be an issue for the read data path provided via read FIFO 26, as a new bus cycle cannot start without the completion of a pending read operation. It is also assumed that read ahead is not performed by the 486-to-ASB bridge 22. Additionally, read data path 30 is a normal FIFO for read operations that start with both address lines A2 and A3 equal to zero "0". Furthermore, read data path 30 comprises a normal FIFO for read operations that are non burst. Finally, all remaining read operations, i.e., non-sequential burst read operations, start with the FIFO filling in the normal way. The FIFO is not emptied until it is completely full, after which the data is removed in the order expected by the 486™DX processor 12.

According to the implementation taught in FIG. 1, certain efficiencies are realized by the provided interface between a processor and a bus and memory. More particularly, the 496 interface 33 is assumed to be operating at 33 MHz, while the ASB interface and the SDRAM interface are each operating at 100 MHz. Generally, such implementation will result in a very high performance interface. Write operations are fully buffered at the 496 interface.

In order to burst data to SDRAM 40, data from the much slower 486 interface needs to be buffered. However, if the buffering is done in SDRAM controller 38, ASB bus 16 would be busy with data from a 33 MHz source. By placing the buffering operation in the 486-to-ASB bridge 22, processor 12 is enabled to finish in the fastest possible amount of time. Such data is then transferred across ASB bus 16 through an ASB interface and into an ASB device 46. One such ASB device 46 comprises an, SDRAM controller 38. Finally, controller 46 delivers such data across bus 39, provided between controller 38 and SDRAM 40, and through an SDRAM interface 41 at 100 MHz. This holds for all write transfers.

Accordingly, the implementation depicted in FIG. 1 will be very high performance for write operations, and will maximize the memory bandwidth that is available at the ASB interface 43 and SDRAM interface 39 for use by other devices connected on ASB bus 16 and/or PCI bus 18. The majority of read operations will start at a naturally aligned address. As a consequence, transfers will be very high performance, and the ASB and SDRAM interfaces 36 and 39 can be made available for other transfers while the data in the read FIFO 26 is being transferred to 486™DX processor 12.

Similarly, non burst transfers are handled in a conventional straight forward fashion as is presently well understood in the art. As a general rule, non burst transfers include all input/output (I/O) transfers and all non cache-able memory transfers. However, read operations from addresses that are not naturally aligned are a very different matter. For these cases, operations will not complete in the fastest possible time because the data access from SDRAM 40 and data flow across ASB 16 is not in the desired order. Such transfer is shown below with reference to FIG. 2.

FIG. 2 illustrates a theoretical transfer from 496 command through data delivery, with the ASB and SDRAM transfers shown. More particularly, minimum access time for non-sequential access pursuant to an alternative theoretical implementation is shown. This theoretical implementation assumes an ASB that supports non-sequential burst transfers, which is presently believed to not exist. An example transfer is shown for this theoretical implementation with memory interface optimized for a 496 bursting order. However, such implementation sequence is not optimal for several reasons. The transfers shown at the ASB bus are supported as a sequential access, and would have to be broken into individual cycles. Such result is not desirable as it would require the use of excessive bandwidth which adds cost and complexity to the interface design. Finally, even if the above reason for non-optimal performance could be solved for the isolated out of order burst case for the 496 processor, the new transfer order would not be supported by other ASB masters. Other ASB masters would not support a non-sequential burst order. Accordingly, a new solution pursuant to Applicant's invention depicted in FIG. 1 is implemented via non-sequential burst access as shown below with reference to FIG. 3.

FIG. 3 illustrates the effect of waiting for the ASB transfer to complete prior to starting the 496 transfer. Instead of being able to return the first CPU-requested word in the first clock of filling the FIFO, the FIFO must first fill the other three words before returning the first CPU-requested word. For :the case where each subsequent word is returned in a 10 nanosecond clock, an additional 30 nanoseconds is required. Consequently, always waiting for the FIFO to fill will result in one extra 33 MHz processor clock for non-aligned burst transfers.

However, the bandwidths of the ASB and SDRAM are not affected. Hence, optimal use of Applicant's invention will only generate a minor impact on the 496 interface. For the case of this exemplary cycle, the cycle was increased from 9 to 10 cycles. This generated approximately an 11% decrease in performance. However, when applied to actual operating conditions typically encountered such decrease is actually much less than an 11% decrease in performance.

Assuming that the bus is busy 80% of the time, that reads are 80% of the bus cycles (resulting from cache misses), and that 20% of the burst requests are not naturally aligned, then the impact on typically encountered performance will be about 1.4% (0.11 * 0.80 * 0.80 * 0.20=1.4%). This calculation assumes limited operation of the bus. Accordingly, such a relatively small performance decrease will be more than made up for with the advantages provided by SDRAM.

Transfer Details

| | |
|---|---|
| 486 req 0 | |
| RAM access | - - - -0-1-2-3 |
| Data to 486 | - - - - 0 - 1 - 2 - 3 |
| 486 req 1 | |
| RAM access | - - - -0-1-2-3 |
| Data to 486 | - - - - - 1 - 0 - 3 - 2 |
| 486 req 2 | |
| RAM access | - - - -0-1-2-3 |
| Data to 486 | - - - - - 2 - 3 - 0 - 1 |
| 486 req 3 | |
| RAM access | - - - -0-1-2-3 |
| Data to 486 | - - - - - 3 - 2 - 1 - 0 |

With respect to the Intel 496™DX processor implementation described above, the Intel 486™DX2 and 486™DX4 only do write burst when the BS8# and BS16# lines are asserted. For the case of an Intel Pentium processor, burst writes are performed for cache line writes, but the starting address is always aligned. Additionally, bursts that are less than 4 words will also need to be accommodated. Although this will generally be a rare event, it is possible for an Intel 486™DX2 processor to do a read operation that is less than 16 bytes but still bursts (by way of a coprocessor read). Such read operations will follow the same process as described above, reading the entire memory space, and flushing the read buffer/FIFO when the 496 processor ends the burst. Finally, it is intended that all byte enables will be treated as asserted for all burst read operations.

Numerous alternative implementations are envisioned according to Applicant's invention. For example, it is possible to use an Intel 496 processor in a manner that accommodates memory systems that do not support the required burst order. One such technique is achieved by performing interrupted burst cycles. However, such implementation would add to complexity and cost.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus for interfacing a processor with a bus of a computer system wherein the processor performs burst read operations in both a sequential and a non-sequential manner and the bus is incapable of supporting burst operations that are non-sequential, comprising:

an interface adaptor circuit coupled between the processor and the bus, operative as a burst order translator between the processor and the bus, and having a bridge configured to connect together the processor and the bus and operative to translate processor burst operations into operations supported by the bus, the bridge having a processor interface coupled between the processor and the interface adaptor circuit and a bus interface coupled between the bus and the interface adaptor circuit;

wherein the bridge is operative to enable compatibility between the processor interface and the bus interface such that non-sequential burst access from the processor is supported and deliverable as sequential burst access to the bus and wherein the bridge comprises a write FIFO and a read FIFO.

2. The apparatus of claim 1 wherein the bridge is configured to execute sequential read burst orders on the bus.

3. The apparatus of claim 1 wherein the bus comprises an ASB bus and the bridge comprises a 486-to-ASB bridge coupled between the processor and the ASB bus.

4. The apparatus of claim 3 wherein the 486-to-ASB bridge further comprises a 486-to-ASB interface.

5. The apparatus of claim 1 wherein the read FIFO comprises a read data path.

6. The apparatus of claim 5 wherein the read FIFO further comprises a read path controller.

7. The apparatus of claim 1 wherein the bus comprises an ASB bus, and further comprising an ASB device coupled to the ASB bus.

8. The apparatus of claim 7 wherein the ASB device comprises a memory controller, the apparatus further comprising a memory coupled with the memory controller.

9. The apparatus of claim 1 wherein the bus comprises an ASB bus, the apparatus further comprising a memory subsystem coupled to the ASB bus for conveying data to and from the processor.

10. The apparatus of claim 1 wherein the bus comprises an ASB bus, the apparatus further comprising an ASB-to-PCI bridge coupled to the ASB bus.

11. The apparatus of claim 10 further comprising a PCI bus coupled to the ASB-to-PCI bridge, and further comprising a PCI device coupled to the PCI bus.

12. A computer system, comprising:

a processor configured to perform burst read operations in both a sequential and a non-sequential manner;

a bus incapable of supporting burst read operations that are non-sequential; and an interface adaptor circuit coupled between the processor and the bus, and having a bridge configured to connect together the processor and the bus and operative to translate processor burst operations into bus-compatible burst operations;

wherein the bridge is configured to enable compatibility between the processor and the bus such that non-sequential burst access from the processor is supported and deliverable as sequential burst access to the bus, wherein the bridge comprises a read path controller and a read data path, the read data path controller operative to detect a non-aligned transfer along the read data path from the bus to the processor, and wherein the read path controller and the read data path cooperate to form a read FIFO, the read FIFO operative to empty when full responsive to detection of a non-aligned transfer.

13. The computer system of claim 12 wherein the bridge executes sequential read bursts on the bus.

14. The computer system of claim 12 wherein the bridge comprises a processor interface and a bus interface, the processor interface coupled between the processor and the interface adaptor circuit, and the bus interface coupled between the bus and the interface adaptor circuit.

15. The computer system of claim 12 further comprising a processor interface coupled between the processor and the interface adaptor circuit, the processor interface converted by the interface adaptor circuit from a non-sequential burst interface to a sequential ASB interface.

16. The computer system of claim 12 further comprising a bus interface associated with the interface adaptor circuit, the bus interface realized as a sequential ASB interface.

17. The computer system of claim 12, wherein detection of a non-aligned transfer is indicative of when a transfer does not start out at a normal burst line boundary.

18. A method for communicating between a processor and a bus of a computer system wherein the processor performs burst read operations in both a sequential and a non-sequential manner and the bus is incapable of supporting burst operations that are non-sequential, the method comprising the steps of:

configuring an interface adaptor circuit between the processor and the bus to operate as a burst order translator;

receiving burst read operations from the processor comprising at least one of sequential and non-sequential read operation burst orders;

translating the received processor burst operations into operations supported by the bus so as to enable compatibility between the processor and the bus such that non-sequential burst access from the processor is supported and deliverable as sequential burst access to the bus;

detecting a non-aligned transfer; and filling a read FIFO of the interface adaptor circuit, then emptying the read FIFO in a requested non-sequential read operation burst order.

19. The method of claim 18, further comprising the step of receiving the translated processor burst operations with the bus.

20. The method of claim 19 further comprising the step of delivering the translated processor burst operations from the bus to a memory subsystem.

* * * * *